J. K. FINLAY.
ATTACHMENT FOR WATER PIPES.
APPLICATION FILED MAR. 11, 1912.
1,058,572.
Patented Apr. 8, 1913.
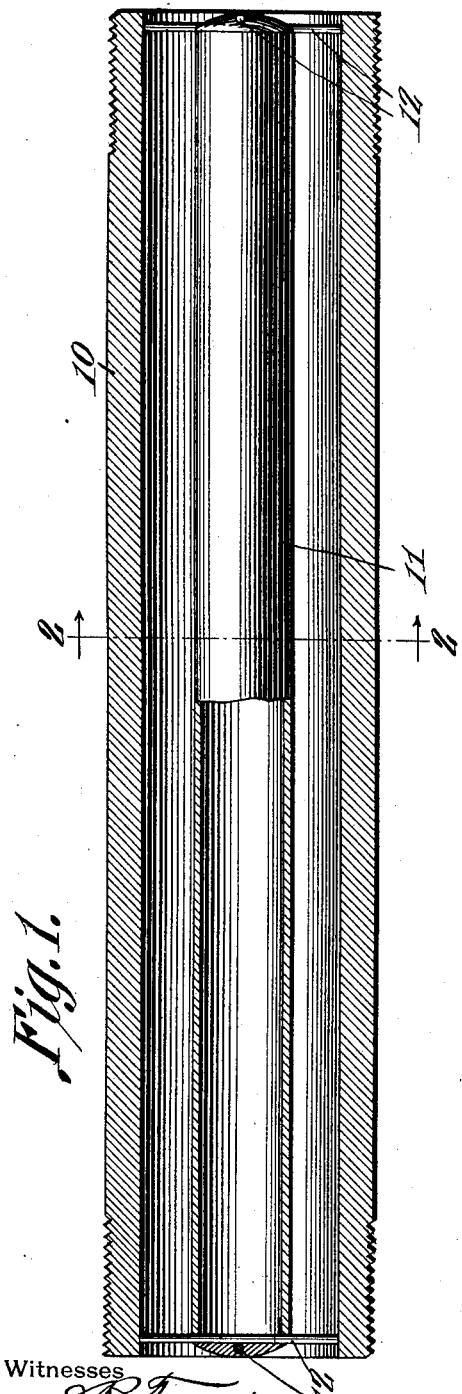
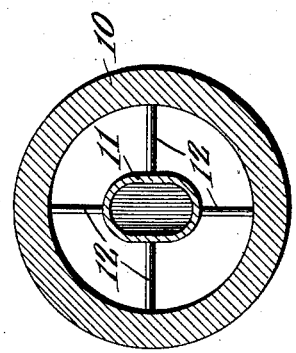
John K. Finlay,
Inventor
by C.A. Snow & Co.
Attorneys

UNITED STATES PATENT OFFICE.

JOHN K. FINLAY, OF LLANO, TEXAS.

ATTACHMENT FOR WATER-PIPES.

1,058,572. Specification of Letters Patent. Patented Apr. 8, 1913.

Application filed March 11, 1912. Serial No. 682,868.

*To all whom it may concern:*

Be it known that I, JOHN K. FINLAY, a citizen of the United States, residing at Llano, in the county of Llano and State of Texas, have invented a new and useful Attachment for Water-Pipes, of which the following is a specification.

This invention relates to an attachment for water pipes which will prevent the bursting of the pipes occasioned by the freezing of the water which passes through the same.

The primary object of the present invention is to provide means to be disposed interiorly of the water pipe which will take up the expansion of the water as the same freezes, increasing the diameter of the pipe through the contraction of said means.

With the foregoing and other objects in view which will appear as the description proceeds, the invention resides in the combination and arrangement of parts and in the details of construction hereinafter described and claimed it being understood that changes in the precise embodiment of the invention herein disclosed can be made within the scope of what is claimed without departing from the spirit of the invention.

In the drawings, forming a part of this specification:—Figure 1 is a longitudinal section. Fig. 2 a section on the line 2—2 of Fig. 1, and Fig. 3 an end elevation of the device removed from pipe.

In the drawings: 10 designates the section of pipe which receives the flexible tubular member 11. This member may be of any suitable configuration and is formed of soft metal, the terminals of the member 11 being closed. The hollow member 11 is spaced from the wall of the pipe by the radially extending arms 12 which hold the side walls of the tubular member 11 at points equidistant from the walls of the pipe.

It will be noted that when the water which passes through the pipe freezes that the expansion occasioned by such freezing will be taken up by the flexible member, said flexible member yielding more readily to the pressure of the water than the iron pipe 10. Thus it will be noted that the tubular member 11 may be compressed until the same is practically flattened, this compression of the member increasing the area of the pipe thereby preventing the same from bursting.

It will be noted that the member 11 may be formed of various materials and that the same may be spaced from the wall of the pipe in any suitable manner.

The many advantages of a construction will be clearly apparent and it will be noted that the same provides a simple and efficient means for increasing the area of the pipe to prevent the bursting of the same by the pressure created by the freezing of the water which passes therethrough. It will also be noted that the structure is such that it may be easily and economically manufactured and that the device may be readily inserted within the pipe sections.

Having thus described the invention what is claimed as new is:—

In a pipe, a hollow member located centrally therein, said member being formed of soft pliable metal and provided with closed thickened ends, circular rods disposed in said ends and extending at right angles to each other for maintaining said hollow member in spaced relation with respect to the pipe.

In testimony that I claim the foregoing as my own, I have hereto affixed my signature in the presence of two witnesses.

JOHN K. FINLAY.

Witnesses:
KELLUS CARTER,
G. W. HOUSE.

Copies of this patent may be obtained for five cents each, by addressing the "Commissioner of Patents, Washington, D. C."